United States Patent

[11] 3,619,415

| [72] | Inventors | Henry B. Jones;<br>Dorrance P. Bunn, Jr.; Dale Williams, all of Houston, Tex. |
|---|---|---|
| [21] | Appl. No. | 845,824 |
| [22] | Filed | July 29, 1969 |
| [45] | Patented | Nov. 9, 1971 |
| [73] | Assignee | Texaco Inc.<br>New York, N.Y. |

[54] METHOD AND APPARATUS FOR FLUID CATALYTIC CRACKING
20 Claims, 1 Drawing Fig.

[52] U.S. Cl. .................................................. 208/164, 208/155, 23/288 S
[51] Int. Cl. .................................................. C10g 13/18
[50] Field of Search ...................................... 208/150, 163, 164, 155; 23/288.3 S

[56] References Cited
UNITED STATES PATENTS

| 3,053,753 | 9/1962 | Slyngstad et al. | 23/288.3 |
| 3,142,543 | 7/1964 | Slyngstad et al. | 208/150 |
| 3,188,184 | 6/1965 | Rice et al. | 208/150 |
| 3,433,733 | 3/1969 | Bunn et al. | 23/288 |
| 3,448,037 | 6/1969 | Bunn et al. | 208/164 |

Primary Examiner—Herbert Levine
Attorneys—K. E. Kavanagh and Thomas H. Whaley

ABSTRACT: This invention relates to an improved method and apparatus for fluid catalytic cracking of hydrocarbon oils, for example, virgin gas oils from petroleum sources and cycle gas oils from the cracking thereof. More particularly, this invention relates to fluid catalytic cracking of at least one feedstock in transfer line risers terminating in a multidiameter reactor-separator chamber with attendant stripping and regenerator of the catalyst.

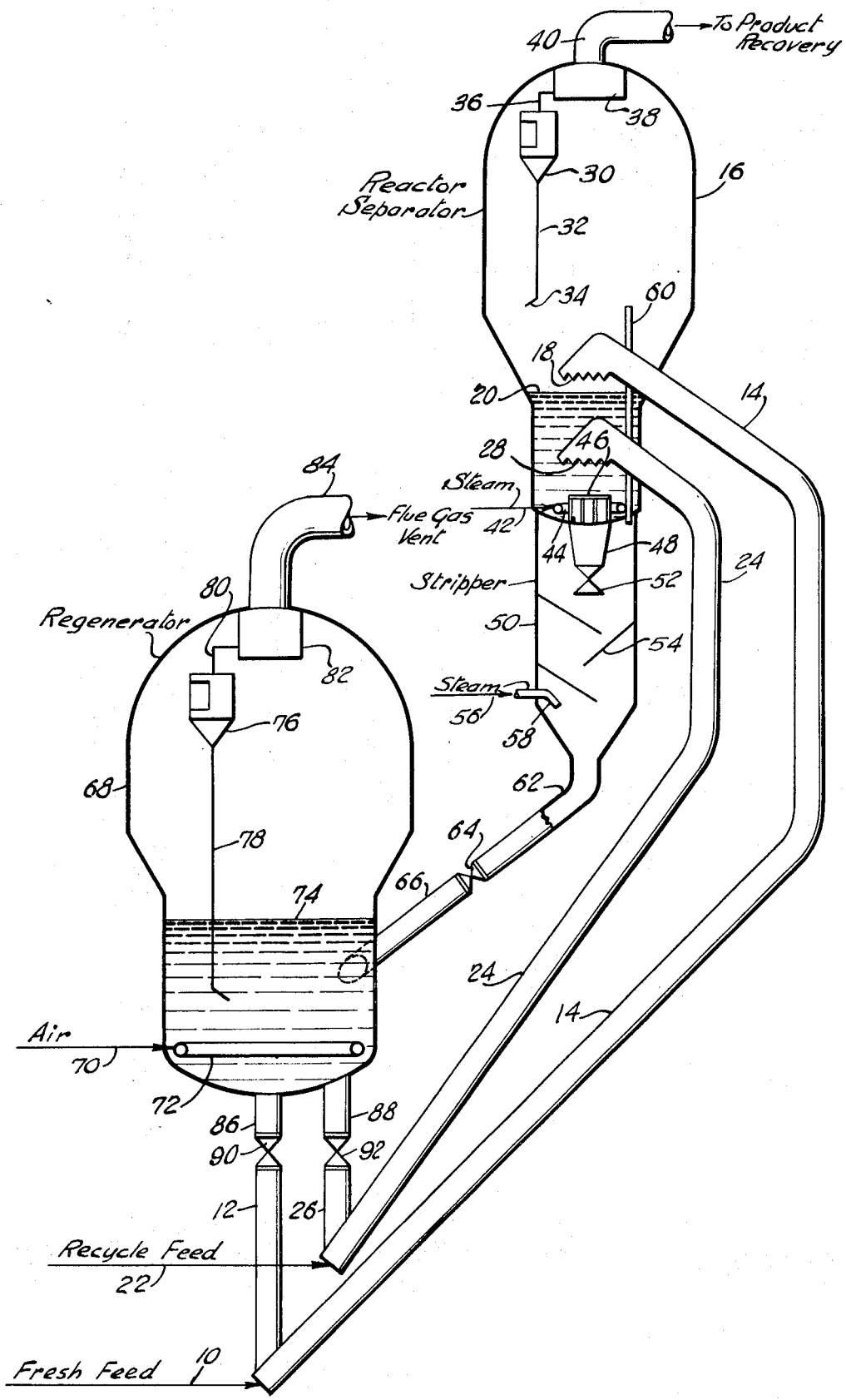

METHOD AND APPARATUS FOR FLUID CATALYTIC CRACKING

CROSS-REFERENCE TO RELATED APPLICATIONS

The method and apparatus of this invention may incorporate the improvements in fluid catalytic cracking disclosed and claimed in U.S. Pat. No. 3,448,037 and in catalyst regeneration disclosed and claimed in U.S. Pat. No. 3,394,076, both assigned to Texaco Inc.

BACKGROUND OF THE INVENTION

In the fluid catalytic cracking process, hydrocarbons are converted under conditions such that substantial portions of a hydrocarbon feed are transformed into desirable products with concomitant deposition of coke on the catalyst. Catalyst is withdrawn from the reaction zone and passed through a stripping zone wherein occluded and accompanying hydrocarbons are displaced from the catalyst by means of a stripping medium such as steam. The stripping medium and removed hydrocarbons are passed into the reaction zone and stripped catalyst is withdrawn to a regeneration zone wherein the catalyst is contacted with an oxygen-containing gas effecting combustion of at least a portion of said coke and regeneration of the catalyst. Regenerated catalyst is then passed to the reaction zone and therein contacted with additional hydrocarbon.

In the development of the fluid catalytic cracking process, it has been recognized that recycle stocks such as cycle gas oil separated from the fluid catalytic cracking product are more refractory than virgin stocks such as the distillates from crude distilling operations. These more refractory recycle stocks are generally cracked under more severe conditions than virgin stocks. It has also been recognized that a short period of contact between the cracking stock and the catalyst results in superior yields as compared to a long period of poor contact.

Various apparatus configurations have been proposed to obtain different cracking conditions for fresh feed and recycle stocks and to achieve more intimate catalyst-oil contact. In one configuration, fresh feed is cracked in a transfer line reactor and recycle oil feed is injected into the dense phase bed of a second reaction zone which receives the catalyst from the transfer line reactor. A disadvantage of this operation is that the fresh feed riser must supply all of the heat for cracking both fresh and recycle feed and consequently the fresh feed may be overcracked with resultant loss in yield and stability of the gasoline produced.

In recently issued U.S. Pat. No. 3,433,733, an apparatus for fluid catalytic cracking is described where one riser conduit passes through the tapered wall of a reactor chamber terminating in a downwardly directed outlet. Another riser conduit passes concentrically through a stripping chamber discharging upwardly into the reactor chamber. Such an apparatus configuration has enjoyed commercial success and finds particular advantage where the cracking unit size ranges upward of 20,000 barrels per day of fresh feed.

An object and advantage of the apparatus configuration set forth in the instant invention resides in its broader applicability with regard to unit size. Illustratively, the invention contemplated herein provides for the basis for fabricating units having throughputs ranging from a few thousand barrels per day i.e., 3,000 to 12,000 barrels per day, up to and exceeding units having capacities of 100,000 barrels per day or more. Important aspects of the instant invention permitting flexibility in unit size and ease of construction resides in the manner wherein riser conduits enter a reactor-separator chamber and the means whereby simplified symmetrical solids flow occurs at the lower portions of the reactor-separator and stripping chambers.

SUMMARY OF THE INVENTION

Broadly, this invention contemplates an apparatus for fluid catalytic cracking comprising:

a. a reactor-separator chamber having a tapered portion of greater diameter at the upper portion than at the lower portion;
b. a stripping chamber;
c. a regenerator chamber;
d. a first riser conduit entering and passing through the tapered side wall of said reactor-separator chamber and discharging into the tapered portion of said reactor-separator chamber;
e. a second riser conduit entering and passing through the side wall of said reactor-separator chamber and discharging into said reactor-separator chamber at a point below said first riser;
f. means to introduce steam into the lower portion of said reactor-separator chamber;
g. means to withdraw vapors from said stripping chamber;
h. means to withdraw gaseous products and steam from the upper portion of said reactor-separator chamber;
i. means to withdraw solids from the lower portion of said reactor-separator chamber and to discharge the same into said stripping chamber;
j. means to introduce steam into the lower portion of said stripping chamber;
k. means to withdraw solids from the lower portion of said stripping chamber and to discharge the same into said regenerator chamber;
l. means to introduce combustion gas into the lower portion of said regenerator chamber;
m. means to withdraw flue gas from the upper portion of said regenerator chamber;
n. means to withdraw regenerated catalyst from said regenerator chamber and to discharge the same into the inlet of said riser conduits; and
o. means to introduce oil feed into the inlet of said riser conduits.

In accordance with the present invention, at least a portion of the reaction is effected in each of a first and second riser conduit by contacting similar or dissimilar hydrocarbon reactant materials in each riser such as virgin gas oils or cracked cycle gas oils or mixtures thereof with a finely divided fluid cracking catalyst. A tapered reactor-separator chamber arrangement is provided and first and second riser conduits pass through the wall of and into the reactor-separator chamber discharging the fluid streams therein. The fluid streams are discharged at different levels within the reactor-separator chamber wherein disengagement of the cracked hydrocarbons and catalyst is effected. Further, additional cracking can be undertaken within the reactor-separator chamber, the degree of such additional cracking, being responsive to the level of the dense phase catalyst bed maintained within the reactor-separator chamber. The fluid streams discharging from the first and second riser conduits into the reactor-separator chamber are directed downwardly or horizontally thereby providing a means for readily disengaging and separating hydrocarbon vapors from catalyst.

In one embodiment, the reactor-separator chamber is a conic or tapered section from a point at about the juncture of the upper portion of the stripping chamber wall and the lower portion of the reactor-separator where solids are withdrawn to a point above the discharge of the riser conduits. In another embodiment, the tapered reactor-separator chamber comprises at least two portions or zones, namely, a lower cylindrical portion and a tapered portion having a greater diameter at its upper portion than the lower cylindrical portion. In one embodiment, the tapered portion is surmounted by a larger cylindrical portion, the tapered portion providing for the transition from the smaller diameter of the lower cylindrical portion to the larger diameter of the upper cylindrical portion and being in open communication with the lower and upper cylindrical portions. The top of the reactor-separator is closed by a dished, domed or hemispherical head. A first hydrocarbon feed is introduced and discharged into the tapered portion through a riser conduit passing through the tapered wall of the tapered portion. Another hydrocarbon feed is introduced into the reactor.separator chamber by means of a second riser conduit which passes through a wall of the reactor-separator at a point below the first riser entry and discharges below the first hydrocarbon feed. Preferably, the second riser conduit enters the chamber through the wall of the lower cylindrical portion. The first and second riser conduits discharge within the reactor-separator chamber by means of horizontally or downwardly or a combination of horizontally and downwardly directed riser terminal outlets. For example, the first riser conduit may discharge in a downwardly directed terminal and the second riser conduit may be such that the outlet or terminal discharges its stream horizontally. Preferably, the first and second riser conduits discharge within the reactor-separator chamber by means of downwardly directed terminal outlets.

A stripping medium is introduced into the lower portion of the reactor-separator chamber at or near the point of withdrawal of catalyst and below the point of introduction of the first and second hydrocarbon streams. Catalyst withdrawn from the reaction zone is passed through a separate stripping chamber wherein it is contacted with a stripping medium, for example, steam. Gaseous effluent comprising stripping medium and hydrocarbons displaced from the catalyst is discharged from the separate stripping zone through a vapor conduit which in turn discharges into the reactor-separator chamber and preferably in the upper portion thereof, i.e., above the point at which the hydrocarbon streams are introduced into the reactor-separator chamber.

In accordance with this invention, a unique reactor riser configuration provides separate cracking of at least two hydrocarbon streams at conditions which are optimum for each. At the same time efficient conditions for contacting the catalyst and oil vapors are maintained throughout the entire system. In one embodiment of this invention, the reactor-separator vessel is positioned adjacent to and above the regenerator vessel. In another embodiment, the reactor and regenerator may be incorporated into a unitary structure with the reactor superposed on the regenerator. Separate standpipes and risers are provided for fresh feed and recycle gas oils or mixed hydrocarbon oil streams. The risers enter the reactor-separator through the wall of the reactor-separator chamber, the first riser passing through the tapered wall of the chamber and the second riser passing through a wall of the chamber below the first riser where each of the risers terminate in horizontally or downwardly directed outlets.

Catalyst and reaction products disengage from each other in the upper portion of the reactor-separator chamber with further separation being obtained through gas-solid separating means such as one or more stages of cyclone separators. The spent catalyst and entrained oil vapors are transferred from the lower cylindrical portion of the reactor-separator chamber by gravity flow through slide valves into the stripping chamber. Stripping medium, for example, steam is introduced into the lower section of the stripping chamber and the downflowing catalyst is intimately contacted with upflowing stripping steam. The stripping medium plus stripped vapors leave the stripping chamber through a vapor conduit discharging into the reactor-separator chamber above the first riser conduit and into the dispersed phase area or disengaging space defined by the head or the upper cylindrical portion of the reactor-separator chamber.

Catalyst descending through the stripping chamber is countercurrently contacted with stripping medium to free the catalyst of occluded and entrained hydrocarbons. Stripped spent catalyst from the lower portion of the stripping chamber flows through a standpipe to the regenerator where the carbonaceous deposit referred to as coke is burned from the catalyst with air.

One advantage of the use of the reactor-separator chamber of this invention and the configuration of apparatus described is that the expansion in cross-sectional area with height of the dense phase bed, dispersed phase and disengaging space permits the establishing of a plurality of zones with different gross vapor loadings while maintaining substantially uniform fluidization conditions. For example, the lower portion of the reactor-separator chamber employs a relatively small amount of stripping medium to effect prestripping operation. Above this prestripping zone where the cross-sectional area of the reaction zone is greater a second vapor stream comprising a hydrocarbon feedstock is introduced as a vapor. In addition to the increase in vapor volume resulting from the successive introductions of a plurality of vapor streams, the cracking of heavy hydrocarbons to hydrocarbons of lower molecular weight results in an increase in the volume of products.

A further advantage of the apparatus configuration described is that the recycle feed may be introduced by means of a second riser conduit into the dense phase catalyst bed to obtain the best distribution of vapors across the reactor cross-sectional area and thus maximize the cracking reaction at a given set of conversion conditions. Alternatively, the dense phase catalyst bed may be maintained below the terminating outlets of both the first and second riser conduits whereby the contact time of the oil and catalyst can be minimized such that substantially no further conversion occurs in the reactor-separator chamber. By maintaining the fluidized bed below the riser outlets essentially all cracking takes place in the first and second riser conduits and the prestripping step takes place in the portion of the reactor-separator below the second riser conduit discharge. The apparatus configuration described also provides for the discharge of a plurality of feedstocks through the first and second riser conduits at the center of the reactor cross section. The expanding reactor with the introduction of a plurality of feedstreams and various elevations permits the introduction of the fresh feed at a higher elevation in the reactor than a recycle gas oil thereby subjecting the more refractory recycle stock to additional catalyst contact when the fluidized bed level is maintained above the recycle gas oil riser discharge. By introducing at least one feedstock into the tapered portion of the reactor-separator chamber and another at a point below the introduction of said first feed, the apparatus described herein provides high velocity contact for both while at the same time providing adequate disengaging in the lower velocity upper section of the chamber. Further, the conic or tapered section permits the use of high velocities in a dense phase bed without exceeding satisfactory disengaging velocities in the upper section of the chamber thereby providing greater flexibility in that adequate velocities may be maintained for good fluidization at low vapor rates such as may be encountered during low conversion operations or operations at reduced throughput.

A further advantage of the apparatus configuration described is that more gasoline with less coke and dry gas can be produced from a barrel of converted gas oil by minimizing the catalyst and oil contact time. Gasoline produced early in the cracking operation occuring in the riser conduits may be cracked further to gas and coke. Therefore, the instant design emphasizes cracking in the risers in preference to reactor catalyst bed cracking. Further, fresh or virgin gas oil feed is cracked under conditions less severe than required for cracking of refractory gas oil which is recycled from a fractionator to the reaction zones. In addition, the instant design provides for cracking of the fresh feed and/or recycle oil feed in separate risers or mixed streams of fresh feed and recycle oil may be cracked in both riser conduits. In this manner severity of cracking may be regulated for optimum conditions. Again, the recycle feed when introduced through one riser may be cracked in the riser or riser and bed combined raking may be employed.

DESCRIPTION OF THE DRAWING

The accompanying FIGURE illustrates and exemplifies one form of the method and apparatus by which the present invention may be practiced and it is not intended to restrict the invention thereby since modifications may be made within the scope of the disclosure and claims without departing from the spirit thereof.

Referring to the FIGURE, a hydrocarbon feed such as a virgin gas oil at 550° F. in line 10 is contacted with hot regenerated catalyst from standpipe 12 at a temperature of about 1130° F. in the inlet portion of a first riser 14. The resulting suspension of catalyst in oil vapor at a temperature of about 925° F. and at an average velocity of about 33 feet per second passes upwardly through feed riser 14 and into reactor-separator 16. Feed riser 14 terminates in a downwardly directed outlet having a serrated edge 18. The purpose of the serrated edge 18 is to provide smooth flow of the hydrocarbon vapors from conduit 14 into reactor-separator 16 particularly when dense bed level 20 fluctuates near the outlet of riser 14 as defined by the serrated edge 18. Alternatively, feed riser 14 may terminate in a horizontally directed outlet where the head of the riser terminal is closed and the sides of the riser terminal slotted so that the direction of the exiting stream is horizontal. Conditions prevailing in the fresh feed riser include a catalyst to oil ratio of 5.6 and a weight hourly space velocity of 69.5. The vapor velocity in the fresh feed riser increases from 16.3 feet per second at the inlet to 29.9 feet per second at the outlet providing a residence time of about 6.6 seconds. Substantial conversion of the fresh feed occurs in the riser and at these conditions amounts to a conversion of 48.8-mole percent of the fresh feed to products boiling below 430° F.

Another hydrocarbon oil feed, for example, an intermediate cycle gas oil fraction separated from cracked products in fractionation equipment not shown having a gravity of about 2° A.P.I. and an end point of about 725° F. is introduced through line 22 into the inlet section of a second riser 24 wherein it is contacted with hot catalyst from standpipe 26. The resulting catalyst-vapor mixture at a temperature of about 925° F. passes upwardly through cycle gas oil riser 24 at an average velocity of about 15 feet per second with a residence time of about 8.9 seconds. Other conditions in the recycle riser include a catalyst to oil ratio of 6.2 and a weight hourly space velocity of 51.8. About 30.6 mole percent of the cycle gas oil is converted to products boiling below 430° F. by the time the products are discharged through the outlet of riser 24 into the lower portion of reactor-separator 16 and below the outlet of conduit 14. Riser 24 terminates in a downwardly directed outlet having a serrated edge 28 and dense bed level 20 may fluctuate from a level just below serrated edge 18 to below serrated edge 28. Alternatively, riser 24 may terminate in a horizontally directed outlet as described in connection with the terminus of riser 14.

When dense bed level 20 is about serrated edge 28, the effluent of the cycle gas oil riser is discharged downwardly or horizontally or a combination of horizontally and downwardly into the dense phase bed in reactor-separator 16 and immediately changes direction and passes upwardly through the dense bed effecting further conversion of the cycle gas oil to 40.6-mole percent of products boiling below 430° F. Other conditions in the bed in reactor-separator 16 when dense bed level 20 is above serrated edge 28 includes a catalyst to oil ratio of 12.3 and a weight hourly space velocity of 3.0. The combined fresh feed riser cracking, recycle riser cracking and reactor bed cracking provide an overall conversion of 65 volume percent of the fresh feed to products boiling below 430° F. The vapor velocities in the reactor are 1.5 feet per second at the point where the recycle riser 24 discharges at serrated edge 28, 3.4 feet per second at the point where the fresh feed discharges at serrated edge 18 and 2.0 feet per second in the upper portion at the cyclone inlets.

Alternatively, when the dense bed level 20 is below serrated edge 28, cracking is essentially conducted in risers 14 and 24 with minimal cracking occuring in reactor-separator 16. In this embodiment, the vapor velocities are 1.7 feet per second at the point where the recycle riser discharges at serrated edge 28, 3.4 feet per second at the point where the fresh feed riser discharges at serrated edge 18 and 2.0 feet per second in the upper portion at the cyclone inlets.

The vapors and any entrained catalyst pass through cyclone 30 wherein entrained catalyst is separated and returned to the bed through dipleg 32 and valve 34. Although a single cyclone is shown for clarity, it will be understood that several cyclones may be assembled in series to achieve substantially complete separation and a plurality of such assemblies may be employed to handle the volume of vapor encountered. Effluent gases pass from cyclone 30 through line 36 to plenum chamber 38 wherein the gases from other cyclone assemblies not shown are collected and discharged from the reactor through line 40. Vapor line 40 conveys the cracked products to fractionation facilities, not shown, wherein the conversion products are recovered and separated into desired products and recycle streams by compression, absorption and distillation facilities well known in the art.

Steam in line 42 is passed to steam ring 44 and discharges into the lower portion of reactor-separator 16 at a point below serrated edge 28 and adjacent outlet 46. Dense phase bed level 20 as stated above may fluctuate from below serrated edge 18 to outlet 46. The dense phase catalyst in the lower portion of reactor-separator 16 is stripped by steam from ring 44 and passes downwardly through outlet 46 and standpipe 48 into stripping chamber 50 through slide valve 52. Stripping camber 50 is provided with baffles 54 attached to the wall of stripper 50. Steam in line 56 is discharged through steam line 58 into the lower portion of stripper 50 under baffles 54. Steam rising through stripper 50 displaces and removes occluded and entrained hydrocarbon vapors which pass upwardly through stripper vent line 60 discharging into the upper portion of reactor-separator 16. Stripped catalyst is withdrawn from the bottom of stripper 50, stripper 50 having a lower tapered portion and thereafter through spent catalyst standpipe 62 at a rate controlled by slide valve 64 and discharges through standpipe 66 into regenerator 68. In regenerator 68 the spent catalyst is contacted with air introduced through line 70 and air ring 72. Catalyst undergoing regeneration in regenerator 68 forms a dense bed having a top level 74. In regenerator 68, carbon on the surface of the catalyst is burned and the resulting flue gas passes upwardly and enters cyclone 76 wherein entrained catalyst is separated and returned to the regenerator dense bed through dipleg 78. Cyclone 76, although represented as a single vessel, may of course comprise an assembly of cyclones arranged in parallel and in series to affect substantially complete separation of entrained solids from the flue gas. Effluent flue gas from cyclone 76 is passed through line 80 into plenum chamber 82 and outwardly through flue gas line 84 to vent facilities not shown which may include means to recover heat from the hot flue gas, means to utilize unconsumed carbon monoxide by the generation of additional heat and means to recover energy by the generation of steam or by expansion through turbines with the generation of power as is well known in the art. Regenerated catalyst is withdrawn from the bottom of regenerator 68 through lines 86 and 88 at rates controlled by slide valves 90 and 92 to supply the hot regenerated catalyst to standpipes 12 and 26 as described above.

We claim:
1. An apparatus for fluid catalytic cracking comprising:
 a. a reator-separator chamber having a tapered portion of greater diameter at the upper portion than at the lower portion and a cylindrical portion in open communication with and depending from the tapered portion;
 b. a stripping chamber;
 c. a stripping chamber;
 c. a regenerator chamber;
 d. a first riser conduit entering and passing through the tapered side wall of said reactor-separator chamber and discharging into the tapered portion of said reator-separator chamber;
 e. a second riser conduit entering and passing through the side wall of said cylindrical portion of said reactor-separator chamber and discharging into the cylindrical portion of said reactor-separator chamber at a point chamber below said first riser;
 f. means to introduce steam into the lower portion of said reactor-separator chamber;
 g. means to withdraw vapors from said stripping chamber;

h. means to withdraw gaseous products and steam from the upper portion of said reactor-separator chamber;
i. means to withdraw solids from the lower portion of said reactor-separator chamber and to discharge the same into said stripping chamber;
j. means to introduce steam into the lower portion of said stripping chamber;
k. means to withdraw solids from the lower portion of said stripping chamber and to discharge the same into said regenerator chamber;
l. means to introduce combustion gas into the lower portion of said regenerator chamber;
m. means to withdraw flue gas from the upper portion of said regenerator chamber;
n. means to withdraw regenerated catalyst from said regenerator chamber and to discharge the same into the inlet of said riser conduits; and
o. means to introduce oil feed into the inlet of said riser conduits.

2. The apparatus of claim 1 wherein said second riser enters and passes through the side wall of said reactor-separator chamber and discharges at a point above said means to introduce steam into the lower portion of said reactor-separator chamber.

3. The apparatus of claim 1 wherein said first riser discharges in a downwardly directed outlet.

4. The apparatus of claim 1 wherein said second riser discharges in a downwardly directed outlet.

5. The apparatus of claim 1 wherein said first riser discharges in a horizontally directed outlet.

6. The apparatus of claim 1 wherein said second riser discharges in a horizontally directed outlet.

7. An apparatus for fluid catalytic cracking comprising:
a. a reactor-separator chamber having a lower cylindrical portion, an intermediate tapered portion and an upper cylindrical portion, said intermediate tapered portion being in open communication with said lower and upper cylindrical portions;
b. a stripping chamber;
c. a regenerator chamber;
d. a first riser conduit entering and passing through the tapered side wall of said intermediate tapered portion and discharging into said intermediate tapered portion through a downwardly directed outlet;
e. a second riser conduit entering and passing through the side wall of said lower cylindrical portion of said reactor-separator chamber at a point below said first riser entry and discharging into said lower cylindrical portion of said reactor-separator chamber;
f. means to introduce steam into the lower portion of said reactor-separator chamber;
g. means to withdraw vapors from said stripping chamber;
h. means to withdraw gaseous products and steam from the upper portion of said reactor-separator chamber;
i. means to withdraw solids from the lower portion of said reactor-separator chamber and to discharge the same into said stripping chamber;
j. means to introduce steam into the lower portion of said stripping chamber;
k. means to withdraw solids from the lower portion of said stripping chamber and to discharge the same into said regenerator chamber;
l. means to introduce combustion gas into the lower portion of said regenerator chamber;
m. means to withdraw flue gas from the upper portion of said regenerator chamber;
n. means to withdraw regenerated catalyst from said regenerator chamber and to discharge the same into the inlet of said riser conduits; and
o. means to introduce oil feed into the inlet of said riser conduits.

8. The apparatus of claim 7, wherein said second riser enters and passes through a side wall of said reactor-separator chamber and discharges at a point above said means to introduce steam into said lower cylindrical portion.

9. The apparatus of claim 7 wherein said second riser discharges in a downwardly directed outlet.

10. the apparatus of claim 7 wherein said second riser discharges in a horizontally directed outlet.

11. In a fluid catalytic cracking process wherein two hydrocarbon streams are contacted with a fluidized cracking catalyst in separate reaction zones effecting conversion of at least a portion of each of said hydrocarbon streams to desired products with the concomitant deposition of coke on said catalyst and wherein said two hydrocarbon streams are introduced into a reaction-separation zone where catalyst is withdrawn from the lower portion of said reaction-separation zone and passed to a separate stripping zone where it is contacted with a stripping medium effecting displacement of occluded and accompanying hydrocarbon from said catalyst, stripped catalyst is passed to a regeneration zone wherein it is contacted with an oxygen containing gas effecting combustion of at least a portion of said coke and regeneration of said catalyst and regenerated catalyst is passed to said separate reaction zones, the improvement which comprises:
establishing and maintaining said reaction-separation zone as a cylinder surmounted by a frustrum of a cone having a greater diameter at its upper portion,
introducing a first hydrocarbon stream entering through the conic wall and downwardly directing said stream into the conic portion of said reaction-separation zone,
establishing and maintaining a dense phase fluidized bed within said reaction-separation zone and below said discharge of said first hydrocarbon stream discharge,
introducing a second hydrocarbon stream entering through the cylindrical wall and directing said stream into the cylindrical portion of said reaction-separation zone below the point of introduction of said first hydrocarbon stream,
introducing stripping medium into the lower portion of said reaction-separation zone below the point of introduction of said hydrocarbon streams into said reaction-separation zone effecting prestripping of said catalyst,
withdrawing stripping medium and displacing hydrocarbons as gaseous effluent from said separate stripping zone, and
passing said gaseous effluent from said stripping zone into said reaction-separation zone at a point above that at which said first hydrocarbon stream is introduced into said reaction zone.

12. The process of claim 11 wherein said second hydrocarbon stream is directed downwardly into said reaction-separation zone.

13. The process of claim 11 wherein said second hydrocarbon stream is directed horizontally into said reaction-separation zone.

14. The process of claim 11 wherein said second hydrocarbon stream is introduced into said reaction-separation zone at a point above said dense phase catalyst bed.

15. The process of claim 11 wherein said second hydrocarbon stream is introduced into said dense phase fluidized bed maintained in said reaction-separation zone.

16. The process of claim 11 wherein said stripping medium is introduced into said reaction-separation zone circumscribing the point of withdrawal of said catalyst from said reaction-separation zone.

17. The apparatus of claim 1 wherein said means to introduce steam into the lower portion of said reactor-separator chamber circumscribes said means to withdraw solids from the lower portion of said chamber.

18. The apparatus of claim 1 wherein said stripping chamber has a lower tapered portion.

19. The apparatus of claim 7 wherein said means to introduce steam into the lower portion of said reactor-separator chamber circumscribes said means to withdraw solids from the lower portion of said chamber.

20. The apparatus of claim 7 wherein said stripping chamber has a lower tapered portion.

* * * * *